(12) United States Patent
Mercer et al.

(10) Patent No.: US 10,953,378 B2
(45) Date of Patent: Mar. 23, 2021

(54) HIGH VOLUME LOW PRESSURE FEEDER SYSTEM

(71) Applicant: Passport Food Safety Solutions, Inc., West Des Moines, IA (US)

(72) Inventors: Micheal Mercer, Bryan, TX (US); Jackson McReynolds, Bryan, TX (US)

(73) Assignee: CHURCH & DWIGHT CO., INC., Princeton, NJ (US)

( * ) Notice: Subject to any disclaimer, the term of this patent is extended or adjusted under 35 U.S.C. 154(b) by 267 days.

(21) Appl. No.: 15/671,109

(22) Filed: Aug. 7, 2017

(65) Prior Publication Data

US 2018/0036703 A1 Feb. 8, 2018

Related U.S. Application Data

(60) Provisional application No. 62/371,672, filed on Aug. 5, 2016.

(51) Int. Cl.
*B01J 19/00* (2006.01)
*B01J 4/00* (2006.01)
(Continued)

(52) U.S. Cl.
CPC ............ *B01J 19/0006* (2013.01); *B01J 3/02* (2013.01); *B01J 4/001* (2013.01); *B01J 4/008* (2013.01);
(Continued)

(58) Field of Classification Search
CPC . B01J 19/24; B01J 19/18; B01J 8/0015; B01J 8/0025; B01J 8/003; B01J 8/0035; B01J 8/007; B01J 4/001; B01J 4/004; B01J 4/007; B01J 4/002; B01J 2208/00592; B01J 2208/0061; B01J 2208/00619; B01J 2208/00628; B01J 2208/00663; B01J 2208/00707; B01J 2208/00752; B01J 2219/0002; B01J 2219/00022; B01J 2219/00166; B01J 2219/00177; B01J 2219/00184; B01J 2219/00186;
(Continued)

(56) References Cited

U.S. PATENT DOCUMENTS 2,675,758 A 4/1954 Hughes
3,343,919 A * 9/1967 Miller ............... B01F 15/00155
422/106

(Continued)

OTHER PUBLICATIONS

George M. Ricks, Environmental Assessment, Nov. 26, 2007.
(Continued)

*Primary Examiner* — Lessanework Seifu
(74) *Attorney, Agent, or Firm* — Kunzler Bean & Adamson, PC (57) ABSTRACT

Embodiments described herein relate to an apparatus for a feeder system. The apparatus includes a reactant source, a reactant reservoir, a frame, and a valve. The reactant source contains a first reactant. The reactant reservoir receives the first reactant from the reactant source and applies a second reactant to the first reactant to facilitate a chemical reaction. The frame is coupled to the reactant source to maintain the reactant source gravitationally directly above the reactant reservoir. The valve is disposed between the reactant source and the reactant reservoir to control flow of the first reactant into the reactant reservoir.

14 Claims, 9 Drawing Sheets

(51) Int. Cl.
  *B01J 19/18* (2006.01)
  *B01J 3/02* (2006.01)
(52) U.S. Cl.
  CPC ...... *B01J 19/18* (2013.01); *B01J 2219/00164* (2013.01)
(58) Field of Classification Search
  CPC .... B01J 2219/00193; B01J 2219/00195; B01J 2219/00211; B01J 2219/00213; B01J 2219/00216; B01J 2219/00218; B01J 2219/0022; B01J 2219/00222; B01J 2219/00225; B01J 2219/00227; B01J 2219/0229
  See application file for complete search history.

(56) References Cited

U.S. PATENT DOCUMENTS

| | | |
|---|---|---|
| 3,362,585 A | 1/1968 | Nessim et al. |
| 3,507,624 A | 4/1970 | Schneider, Jr. et al. |
| 3,995,839 A * | 12/1976 | Zingg ................. B01F 5/205 366/154.2 |
| 4,199,001 A | 4/1980 | Kratz |
| 5,384,102 A | 1/1995 | Ferguson et al. |
| 5,427,748 A | 6/1995 | Wiedrich et al. |
| 5,947,596 A * | 9/1999 | Dowd ................. B01F 3/1271 366/152.6 |
| 7,147,361 B2 * | 12/2006 | Cecala ................. A01C 23/042 366/132 |
| 7,475,793 B2 * | 1/2009 | Wahl ................. B65B 69/0091 222/161 |
| 8,114,298 B2 * | 2/2012 | Fishler ................. B01F 1/0022 122/266 |
| 2004/0122188 A1 | 6/2004 | Burns et al. |
| 2006/0086387 A1 | 4/2006 | Gupta et al. |
| 2007/0090059 A1 * | 4/2007 | Plummer ................. C02F 1/008 210/743 |
| 2009/0129992 A1 | 5/2009 | Mills |
| 2011/0073525 A1 | 3/2011 | Evans |

OTHER PUBLICATIONS

PCT International Patent Application No. PCT/US2017/045811, International Search Report and Written Opinion dated Dec. 5, 2017.

* cited by examiner

FIG. 10

HIGH VOLUME LOW PRESSURE FEEDER SYSTEM

CROSS-REFERENCES TO RELATED APPLICATIONS

This application claims priority to U.S. Provisional Patent Application No. 62/371,672 entitled "HIGH VOLUME LOW PRESSURE FEEDER SYSTEM" and filed on 5, Aug. 2016, which is incorporated herein by reference.

FIELD

This invention relates to chemical compounds and more particularly relates to chemical compound feeder systems.

BACKGROUND

Chemical compounds may be used in various industrial, agricultural, commercial, and/or recreational settings. A chemical compound may be used as a source for another chemical, as a result of a chemical reaction or the like.

Systems for such reactions may operate at high pressures, posing risks of explosion or other hazards. Further, to keep a chemical reaction going, to continue to provide the resulting chemical product, the reactants may need to be replenished over time, by filling a tank or other container. This process can be time consuming, and the chemical reaction may be halted if no one is available to replenish a reactant.

SUMMARY

In accordance with one embodiment, an apparatus for a feeder system is disclosed. The apparatus includes a reactant source, a reactant reservoir, a frame, and a valve. The reactant source contains a first reactant. The reactant reservoir receives the first reactant from the reactant source and applies a second reactant to the first reactant to facilitate a chemical reaction. The frame is coupled to the reactant source to maintain the reactant source gravitationally directly above the reactant reservoir. The valve is disposed between the reactant source and the reactant reservoir to control flow of the first reactant into the reactant reservoir.

In accordance with another embodiment, a feeder system is disclosed. The feeder system includes a reactant source, a reactant reservoir, a frame, and a concentrate reservoir. The reactant source contains a first reactant. The reactant reservoir receives the first reactant from the reactant source and applies a second reactant to the first reactant to facilitate a chemical reaction at atmospheric pressure. The frame is coupled to the reactant source to maintain the reactant source gravitationally directly above the reactant reservoir. The concentrate reservoir receives a product from a reservoir outlet of the reactant reservoir.

In accordance with another embodiment, a method for operating a feeder system is disclosed. The method includes delivering a first reactant from a reactant source to a reactant reservoir at a first side of the reactant reservoir. The method also includes delivering a second reactant into the reactant reservoir at a second side of the reactant reservoir opposite the first side of the reactant reservoir. The method also includes monitoring, by a controller, a reaction of the first reactant with the second reactant. The method also includes applying a first program loop from the controller to maintain a value corresponding to an aspect of the feeder system.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Figure 1:
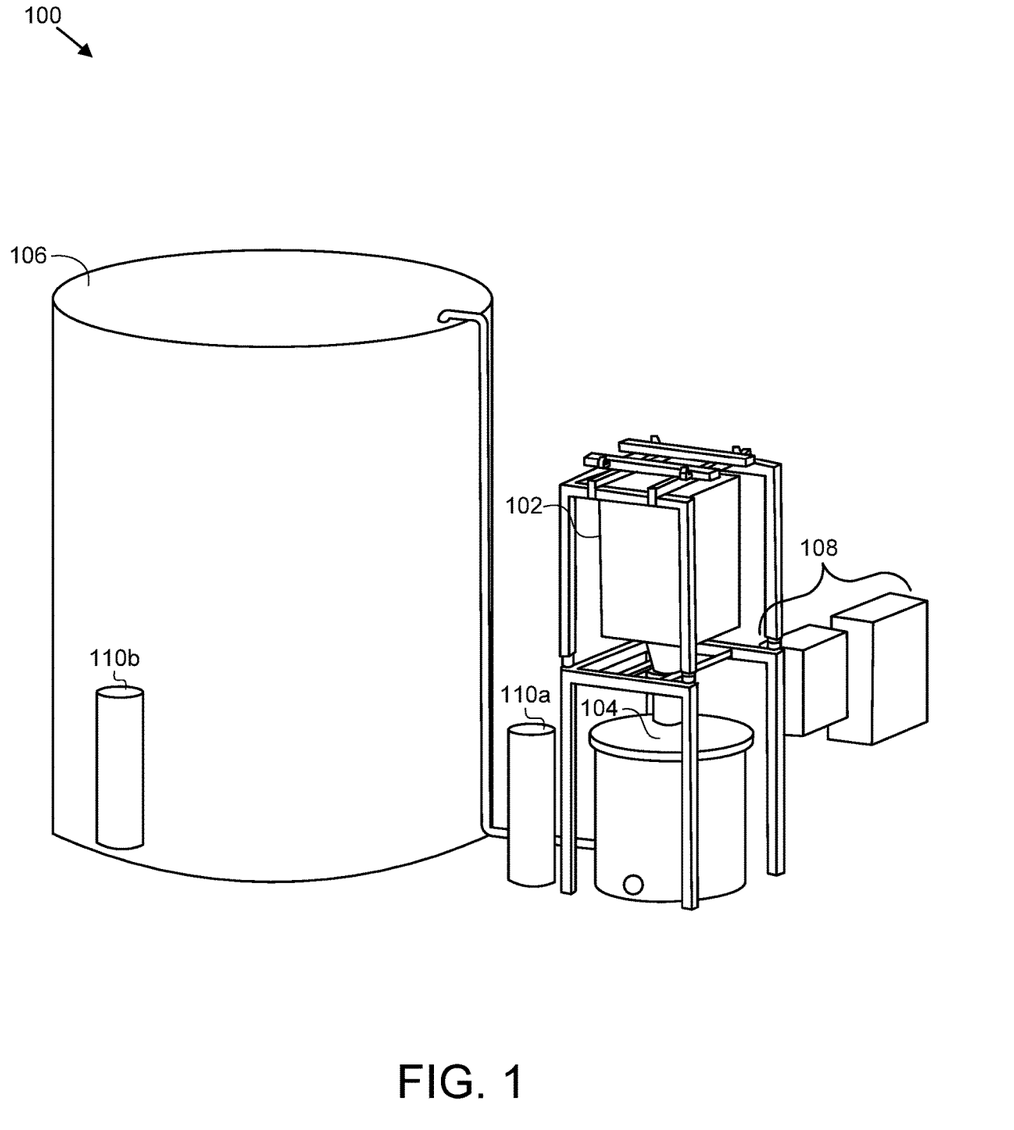
FIG. 1 is a perspective view illustrating one embodiment of a high volume low pressure feeder system.
Figure 2:
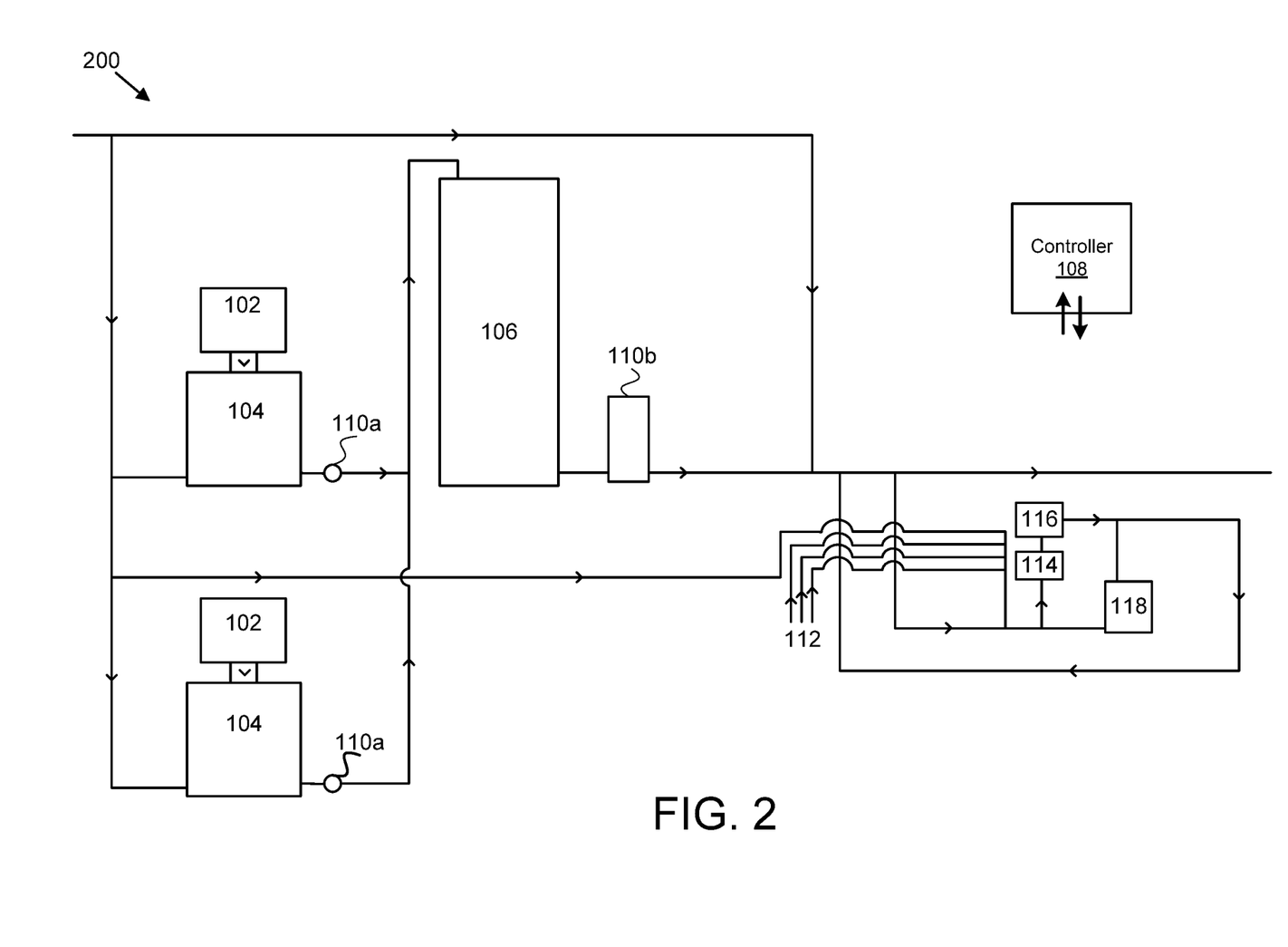
FIG. 2 is a schematic block diagram illustrating a further embodiment of a high volume low pressure feeder system.

FIG. 1 depicts one embodiment of a high volume low pressure feeder system 100. FIG. 1 includes a reactant source 102, a reaction reservoir 104, a concentrate reservoir 106, one or more controllers 108, and one or more pumps 110. FIG. 2 depicts a schematic block diagram of a further embodiment of a high volume low pressure feeder system 200, with two reactant sources 102 and two reaction reservoirs 104.

In certain embodiments, the reactant source 102 stores a chemical compound and provides the chemical compound to the reaction reservoir 104 as a reactant for a chemical reaction with another chemical compound, such as water, to produce a chemical product. The concentrate reservoir 106 may store the resulting chemical product (e.g., an aqueous solution, suspension, or the like), adjust the concentration of the chemical product, and/or provide the chemical product for use.

The reactant source 102 may be sized large enough to provide an extended and/or unattended runtime (e.g., about 24 hours, 30 hours, 40 hours, 50 hours, or more, depending on the produced concentration) without refilling. For example, the reactant source 102 may be configured to receive a large sack or other container of reactant (e.g., a 2200 lb. sack, a "bulk bag," or the like), which may be placed into the reactant source 102 at once, using a forklift, a hoist, or the like, instead of the more labor-intensive task of emptying many buckets or smaller bags of reactant. In embodiments where the reactant source 102 is stacked vertically above the reaction reservoir 104, as depicted in FIG. 1, the system 100 may have a smaller footprint than other systems using several smaller reaction reservoirs 104 in parallel (e.g. using about 40 square feet instead of 84 square feet for a 10-feeder system, or the like).

The one or more controllers 108 and associated sensors, valves, and/or other electrical devices may monitor production of the chemical product, concentration of the chemical product, a fill level of the reactant source 102, and/or other operating conditions, and may allow an administrator or other user to locally and/or remotely monitor and control the system 100 and/or 200 (e.g., from a control panel, from a computing device in communication with the one or more controllers 108 over a data network, or the like). An optical sensor may provide the one or more controllers 108 with closed loop feedback regarding a concentration of the chemical product. The one or more controllers 108, in order to make a more accurate determination of concentration of the chemical product or the like, may receive temperature data for the chemical product and/or for a reactant input, such as water; may receive acidity and/or basicity data (e.g., a pH level) for the chemical product and/or for a reactant input, such as water; or the like and may base a concentration determination on such received data.

One example of a chemical reactant which the reactant source 102 may store is 1,3-Dibromo-5,5-dimethylhydantoin (DBDMH), with a chemical formula of $C_5H_6Br_2N_2O_2$, which the reactant source 102 may store as an anhydrous solid, in crystalline pellets or powder form. The reactant source 102 may provide DBDMH to the reaction reservoir 104, through which water or another reactant may flow, triggering a chemical reaction to produce hypobromous acid (HOBr), a combination of hypobromous acid and 5,5-dimethyldantoin (DMH) (DBDMH+$H_2O$)=2HOBr+DMH), hypobromous acid at least partially dissociated in water (HOBr$\rightleftharpoons$ $H^+$+$BrO^-$), bromide ions, or the like, which may be used as an antimicrobial and/or disinfectant in water or other solution. For example, hypobromous acid may kill salmonella, *E. coli* O157:H7, Shiga toxin-producing *E. coli* (STEC), and/or other undesirable organisms or compounds.

In various embodiments, hypobromous acid may be used as an antimicrobial for processing animal products (e.g., red meat, poultry, pork, seafood, hides, carcasses, heads, organs, and/or other body parts); as an antimicrobial for recreational water such as a swimming pool or hot tub; as a bleaching agent (e.g., in pulp and/or paper mills); as an antimicrobial for industrial and/or commercial water for a water cooling system; as an antimicrobial for drinking water purification; or the like. After disinfection, the hypobromous acid may convert to a bromide ion ($BR^-$) (e.g., HOBr+live pathogens→$Br^-$+dead pathogens), while the DMH may remain in the water without reacting further. In other embodiments, instead of DBDMH, the reactant source 102 may store one or more other chemical compounds as a reactant, such as various salts, bromides, chlorine, and/or other reactants, selected based on the intended chemical reaction and resulting chemical product.

Some examples of chemical compounds that may be used as the reactant or another component of the chemical reaction include but are not limited to peroxyacetic acid (PAA), hydrogen peroxide, acetic acid, 1-hydroxyethylidene-1,1-diphosphonic acid (HEDP), lactic acid, caustic, organic acids, mixed organic acids and inorganic acids, acidified sodium chlorite (ASC), chlorine, DBDMH, and like antimicrobial chemicals. In some embodiments, the chemical(s) of the reactant include one or more chemicals selected from the Food Safety and Inspection Service (FSIS) Directive 7120.1 or a similar list or registry of chemicals.

The reactant source 102 may comprise or be formed of at least one of a plastic, polymer, metal, ceramic, and/or another durable material. The reactant source 102 may comprise a valve, such as an electrically and/or manually actuated iris valve or the like, between the reactant source 102 and the reaction reservoir 104, to control the delivery of a reactant chemical compound from the reactant source 102 to the reaction reservoir 104. The reactant source 102 may comprise an electric gyrator motor, vibrating rods, and/or another agitator to break up reactant within the reactant source 102, move reactant from the reactant source 102 toward the reaction reservoir 104, or the like.

In certain embodiments, the reactant source 102 may substantially fill the reaction reservoir 104 with a reactant and may continue to add additional reactant to the reaction reservoir 104 as reactant is used up in the chemical reaction, so that the reaction reservoir 104 remains substantially full of reactant as long as reactant remains in the reactant source 102 to be delivered to the reactant reservoir 104. A weight and/or pressure of reactant from the reactant source 102 on the reactant in the reaction reservoir 104 and/or an agitator such as an electric gyrator motor or vibrating rods, in certain embodiments, may reduce or prevent channeling or tunneling within the reaction reservoir 104, allowing a more consistent, uniform chemical reaction. In another embodiment, the reactant source 102 (e.g., based on a signal from the one or more controllers 108) meters delivery of reactant to the reaction reservoir 104, in order to adjust and/or maintain a determined concentration, flowrate, pH level, or other characteristic monitored by the one or more controllers 108.

In one embodiment, the reaction reservoir 104 comprises and/or is formed of a plastic or polymer, a metal, a ceramic, and/or another durable material selected to house one or more chemical reactions. The reaction reservoir 104, in the depicted embodiment, includes an opening (e.g., an inlet, port, valve, or the like) through which to receive a first reactant from the reactant source 102 (e.g., DBDMH or another reactant). The reaction reservoir 104, in one embodiment, is not pressurized, but is open to the reactant source 102 through the opening, or the like. The reaction reservoir 104 may comprise a second opening (e.g., an inlet, port, valve, diffuser, or the like) through which to receive a second reactant such as water or the like. The first and second reactants may contact and/or interact with each other within the reaction reservoir 104.

The reaction reservoir 104, in certain embodiments, may receive a first reactant (e.g., DBDMH) at a first end of the reaction reservoir 104 (e.g., a top of the reaction reservoir 104, a bottom of the reaction reservoir 104, or the like) and may receive a second reactant (e.g., water) at a second end of the reaction reservoir 104 (e.g., a bottom of the reaction reservoir 104, a top of the reaction reservoir 104, or the like). For example, in one embodiment, the reaction reservoir 104 may receive a first reactant such as DBDMH through an opening at or toward the top of the reaction reservoir 104, and may receive a second reactant such as water through a diffuser at or toward the bottom of the reaction reservoir 104. In this manner, with fresh, unreacted water being introduced at or toward a bottom of the reaction reservoir 104 and forced upward through DBDMH or another reactant toward a top of the reaction reservoir 104, the chemical reaction may occur more quickly toward the bottom of the reaction reservoir 104, so that unreacted DBDMH or other reactant is less likely to gather or remain toward the bottom of the reaction reservoir 104. In other embodiments, a diffuser may be disposed at or toward the top of the reaction reservoir 104, at or toward a side wall of the reaction reservoir 104, at or toward a center of the reaction reservoir 104, or at another position within the reaction reservoir 104.

The reaction reservoir 104, in one embodiment, comprises one or more outlets. For example, the reaction reservoir 104 may comprise a plurality of outlets to receive a chemical product of the chemical reaction (e.g., a concentration of hypobromous acid in water, or the like). In certain embodiments, the reaction reservoir 104 comprises a primary reservoir (e.g., an inner tank or the like), which receives two or more reactants, in which a chemical reaction occurs, or the like and a secondary reservoir (e.g., an outer tank or the like), which receives a product of the chemical reaction from the primary reservoir through one or more outlets. A secondary reservoir and/or filter may allow fines or other materials to fall out of solution and to settle before the product of the chemical reaction leaves the reaction reservoir 104 to the concentrate reservoir 106 or another destination. An outlet of the secondary reservoir may be offset above a bottom of the secondary reservoir, to provide an area for the fines, contaminants, or other materials to settle within the secondary reservoir of the reaction reservoir 104, instead of being sent through the outlet to the concentrate reservoir 106.

A distance between a reactant inlet (e.g., a water diffuser) and a product outlet, in certain embodiments, may be selected based on the associated chemical reaction and/or a flowrate, to provide at least a target dwell time during which the chemical reaction may occur within the reaction reservoir 104. In one embodiment, a reactant inlet (e.g., a water diffuser) is disposed toward a center of the reaction reservoir 104 (e.g., of a primary reservoir) at or toward one end of the reaction reservoir 104 (e.g., a bottom of the reaction reservoir 104 and/or a primary reservoir) and one or more outlets are disposed toward a perimeter of the reaction reservoir 104 (e.g., of a primary reservoir) at or toward an opposite end of the reaction reservoir 104 (e.g., a top of the reaction reservoir 104 and/or a primary reservoir) to maximize a distance between the inlet and the outlet, making the distance longer than a height of the reaction reservoir 104 or the like.

In one embodiment, the concentrate reservoir 106 comprises and/or is formed of a plastic or polymer, a metal, a ceramic, and/or another durable material selected to house a chemical product from one or more reaction reservoirs 104, such as a concentration of hypobromous acid. The concentrate reservoir 106 may receive a chemical product or other output from a reaction reservoir 104 by way of a first pump 110*a*, or the like. The concentrate reservoir 106 may provide a stored chemical product for use using a second pump 110*b* (e.g., for disinfecting meat or another animal product; for disinfecting recreational, drinking, and/or industrial water; or the like).

In one embodiment, the one or more controllers 108 electrically monitor and/or control one or more operations of the system 100 and/or 200. The one or more controllers 108 may be substantially automated (e.g., allowing the system 100 and/or 200 to operate substantially unattended for an extended period of time), may operate in response to user input, and/or a combination of both.

The one or more controllers 108 may comprise a processor or other logic hardware such as a programmable logic controller (PLC), a field programmable gate array (FPGA), an application specific integrated circuit (ASIC), a central processing unit (CPU), discrete electric components (e.g., relays, timers, sequencers, switches, or the like); a volatile memory; a non-volatile memory medium storing computer readable program code executable by the one or more controllers 108; digital and/or analog inputs; digital and/or analog outputs; a network interface; or the like for managing the system 100 and/or 200.

The one or more controllers 108 may receive input from and/or provide output (e.g., one or more commands or signals) to one or more of a water temperature sensor (e.g., at or before an inlet into a reaction reservoir 104), an agitation motor of a reactant source 102, load cells and/or optical sensors indicating a fill level of a reactant source 102, a shutoff valve, a check valve, a pump 110*a* and/or 110*b*, a concentrate and/or water meter (e.g., a paddle wheel meter), a pH buffer 112, a pH probe 114, an optical sensor 116 such as an ultraviolet (UV) spectrometer, a lens cleaning solution recirculation pump 118, and/or one or more other components of the system 100 and/or 200.

In one embodiment, the one or more controllers 108 manages the system 100 and/or 200 (e.g., determining and/or adjusting an input rate of one or more reactants into a reaction reservoir 104, an input rate of water to dilute a chemical product into or from a concentrate reservoir 106, or the like) to satisfy a target value for a feedback parameter, such as a target concentration, a target flowrate, both a target concentration and a target flowrate, or the like. One embodiment of a concentration detection system is described below with regard to FIG. 8.

The one or more controllers 108, in one embodiment, may provide a user interface to an administrator or other user, such as a graphical user interface (GUI), an application programming interface (API) for integration with third party applications, a command line interface (CLI), a hardware interface (e.g., one or more buttons, keys, switches, dials, knobs, or the like), a web interface accessible over a data network, or the like. The one or more controllers 108 may receive a target concentration and/or a target flow rate from an administrator or other user through an interface. The one or more controllers 108 may provide one or more measured conditions, such as a current concentration (e.g., parts per million of a chemical product such as hypobromous acid or the like), a current flowrate, a current pH level, a current water temperature, or the like to an administrator or other user through an interface. The one or more controllers 108, in certain embodiments, alert an administrator or other user, sound an alarm, close a valve, dilute a product, and/or perform one or more other corrective actions in response to detecting a safety condition (e.g., a concentration above a threshold, a temperature above a threshold, a flow rate above a threshold, or the like).

In some embodiments, the controller 108 operates in one of a plurality of operating modes. In some embodiments, the plurality of operating modes includes a manual mode, a calculated mode, and an auto mode. In some embodiments, one or more of the plurality of modes includes a starting temperature. In some embodiments, the starting temperature is used to calculate an initial concentration for the reactant. In some embodiments, the controller 108 calculates the concentration by applying a multiplier corresponding to the reactant. In some embodiments, the multiplier is a multiplier determined for the reactant at one or more temperatures with a constant flow value.

In some embodiments, the concentration is calculated by the controller 108 using a dilution equation. For example, the dilution equation may be $C_1V_1=C_2V_2$. In some embodiments, the dilution equation provides a ratio for blending the reactants.

In some embodiments, the manual mode receives an input of a value corresponding to the system 100. For example, the manual mode may receive input, at the controller 108, of a temperature, reactant flow rate, product flow rate, mixture ratio, or other value to operate the system 100. In some embodiments, the manual mode applies the input to maintain a constant state of the system 100 based on the input value.

In some embodiments, the calculated mode calculates a value for the system 100 based on a detected value. For example, the controller 108 may measure the temperature value of the water at a water inlet and calculate another value for the feeder system 100. Other values may be monitored and applied to calculate one or more values of the system 100. In some embodiments, the calculated mode applies a proportional-integral (PI) loop. In some embodiments, the ratio for a reactant is determined by the valued calculated by the controller 108. In some embodiments, the calculated value is fed into the PI loop. If water flow is detected, a predetermined pump starting point or percentage is initiated. If no flow is detected or if the flow is below a minimum, the PI loop forces the system into a standby mode. In response to detection or flow being restored to an acceptable threshold, the system 100 reinitiates the pump and brings it up to speed until the calculated ratio is met.

In some embodiments, auto mode intakes a set value and applies a first closed loop. In some embodiments, the auto mode applies a second closed loop. In some embodiments, the second closed loop modifies a value implemented by the first closed loop. For example, the second closed loop may update the reactant ratio based on another input such as a reading from a sensor. In some embodiments, a sensor to update a value in the controller 108 includes an ultraviolet (UV) spectrometer or the like.

In some embodiments, the first closed loop is initialized by the controller 108 with the second closed loop initialized by the controller 108 in response to expiration of a delay timer. In some embodiments, the delay between initialization of the first loop and the second loop allows the first loop to stabilize before the second closed loop is initialized. In some embodiments, this improves the function of the system and prevents spiking of the values that may result from the second closed loop acting on the values before the first closed loop is stable.

In some embodiments, the controller 108 implements the second closed loop in one of a plurality of tuning states. In some embodiments, the plurality of tuning states of the second closed loop include a low, medium, and high tuning state. In some embodiments, fewer or more tuning states are applied. In the examples below, low, medium, and high tuning states are used.

For example, if a system is intended to meet a known maximum flow rate, a pump capable of meeting the maximum flow rate is selected and installed. However, the pump may not operate at the maximum flow rate at all times. During times at which the pump is running below the maximum flow rate, a medium or low tuning state is used. The lower tuning state allows the pump to run at a sub-maximum flow rate while still maintaining a stable and consistent ppm mixture.

In some embodiments, a signal is sent to the system to select a low, medium, or high tuning state PI closed loop. The signal allows the system 100 to have a relatively accurate response when flow to the system 100 is shut off abruptly. In some embodiments, the controller tracks the ratios for an initial flow at X gallons-per-minute that maintains stability. In response to a disruption to the initial flow, the tuning state of the PI closed loop can be adjusted to a faster or slower loop based on the signal received. In some embodiments, this allows the system to adjust to reduce or avoid disruption of the ratio in the system 100. Based on the tuning state selected, the pump may be reset or adjusted to an operating state to provide a corresponding flow rate.

In some embodiments, the controller 108 also operates in a cleaning mode. For example, the cleaning mode may facilitate cleaning of a sensor or other component of the system 100. In some embodiments, in the cleaning mode, the controller 108 switches from one of the auto mode or calculated mode to a cleaning mode. In the cleaning mode, the current target ratio is locked. This provides a period of time in which service can be completed. In some embodiments, the cleaning mode expires after a preset time. In other embodiments, the cleaning mode is manually exited after completion of the service. In some embodiments, the cleaning mode is cancelled in response to detection of a sensor coming back into operation or in response to another detected parameter or condition. In some embodiments, the system 100 returns to the previous operating mode in response to termination of the cleaning mode. In other embodiments, the system 100 returns to a preset mode in response to termination of the cleaning mode.

In some embodiments, one or more of the operating modes (i.e. auto, manual, calculated, etc.) operates one or more safeguards. In one embodiment, the system 100 operates a signal exchange safeguard in which signals are exchanged between components to assure communication is intact. For example, the controller 108 may exchange periodic signals with the UV spectrometer. In other embodiments, the controller 108 monitors flow rates output by the control loops against alarm thresholds. In some embodiments, the operation of the pump is monitored. If the operation of the pump reaches an operation threshold detailing minimum and/or maximum operating parameters, a safeguard may be activated.

These safeguards provide ways to check the operation of the controller 108 as well as other components feeding information to the controller 108. For example, if a ratio is suggested by the closed loops that is outside of the alarm threshold, a failure in the UV spectrometer may be detected. In some embodiments, the system 100 switches to a manual mode in response to detection of a value outside of the alarm threshold. In some embodiments, alerts are sent to maintenance personnel and/or an alarm may be activated. In some embodiments, the thresholds are entered manually. In other embodiments, the threshold values are established based on historical operating data stored by the controller 108 or another component of the system 100.

Figure 3:
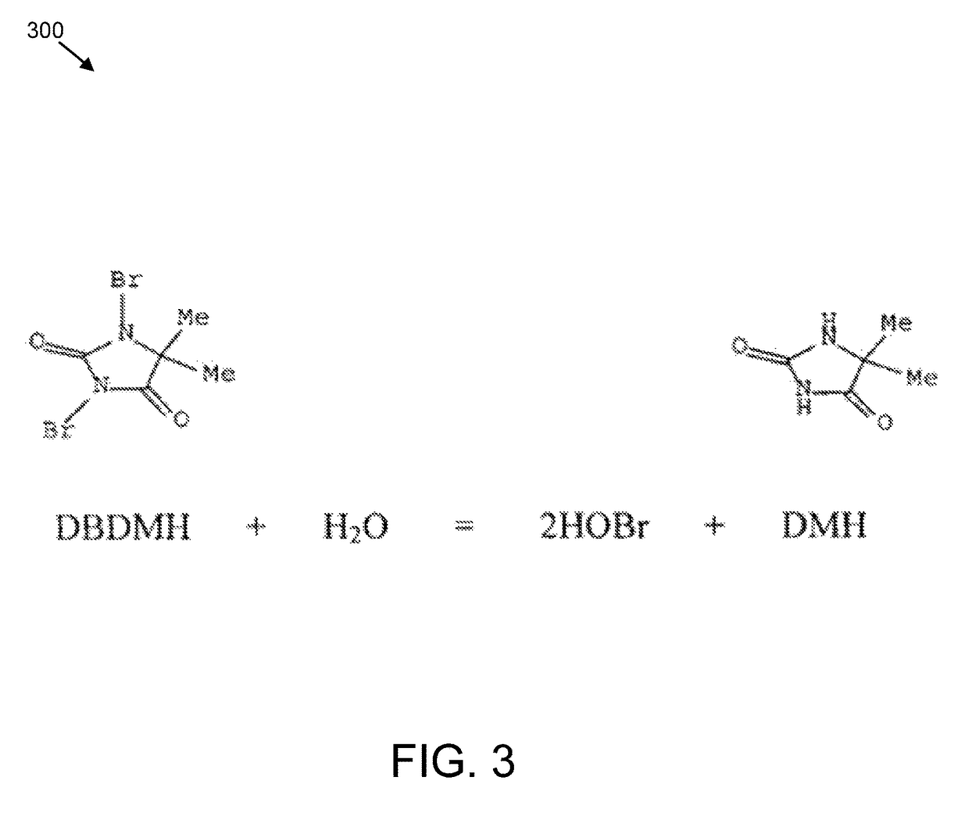
FIG. 3 illustrates one embodiment of a chemical equation for a high volume low pressure feeder system.

FIG. 3 depicts one embodiment of a chemical equation 300 for a chemical reaction within a high volume low pressure feeder system. In other embodiments, other reactants may be used in a different chemical reaction to produce a different chemical product using a high volume low pressure feeder system.

As described above, the reactant source 102 may provide DBDMH to the reaction reservoir 104, through which water or another reactant may flow, triggering a chemical reaction to produce hypobromous acid (HOBr) and DMH. Hypobromous acid may be used as an antimicrobial for processing animal products; as an antimicrobial for recreational water such as a swimming pool or hot tub; as a bleaching agent; as an antimicrobial for industrial and/or commercial water for a water cooling system; as an antimicrobial for drinking water purification; or the like.

Figure 4:
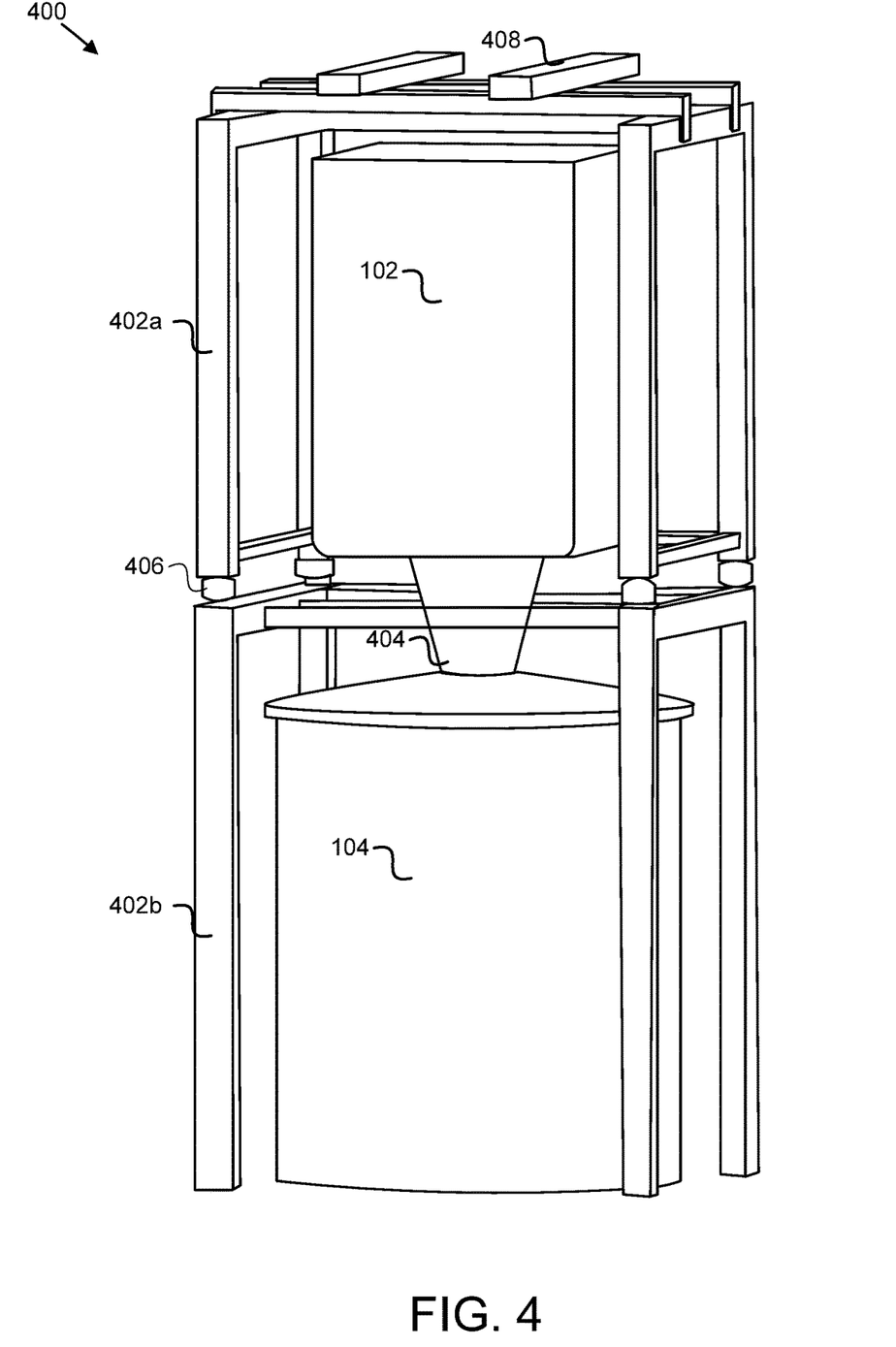
FIG. 4 is a perspective view illustrating one embodiment of a feeder assembly for a high volume low pressure feeder system.

FIG. 4 depicts one embodiment of a feeder assembly 400 for a high volume low pressure feeder system. The feeder assembly 400, in the depicted embodiment, includes a reactant source 102, a reaction reservoir 104, an upper frame 402a, a lower frame 402b, a reactant valve 404, one or more load cells 406, and a loading adapter 408. In certain embodiments, the reactant source 102 and/or the reaction reservoir 104 of FIG. 4 may be substantially similar to those described above with regard to FIG. 1 and FIG. 2.

In one embodiment, the upper frame 402a provides mechanical and/or structural support for the reactant source 102, the lower frame 402b holds the upper frame 402a and/or the reactant source 102 in place over the reaction reservoir 104, or the like. The reactant valve 404 may provide a channel or opening for providing reactant from the reactant source 102 to the reaction reservoir 104, which may be selectively opened or closed by the one or more controllers 108. In certain embodiments, the reactant valve 404 may comprise an iris valve or other valve with a dynamically sizable opening which the one or more controllers 108 may use to adjust or otherwise control a rate at which reactant is introduced into the reaction reservoir 104 from the reactant source 102.

In the depicted embodiment, four load cells 406 are disposed between the upper frame 402a and the lower frame 402b, with the upper frame 402a supporting the reactant source 102 on the load cells 406. The load cells 406 may be in communication (e.g., electrically, wirelessly) with the one or more controllers 108 so that the load cells 406 may communicate weight data to the one or more controllers 108 allowing the one or more controllers 108 to monitor a fill state of reactant in the reactant source 102 (e.g., based on a change in measured weight or the like), to provide associated status reports and/or alerts to a user to add reactant to the reactant source 102, or the like. The loading adapter 408 may allow a user to add reactant to the reactant source 102 (e.g., a sack, a "bulk bag," or the like) using a forklift, hoist, crane, or other machinery.

Figure 5:
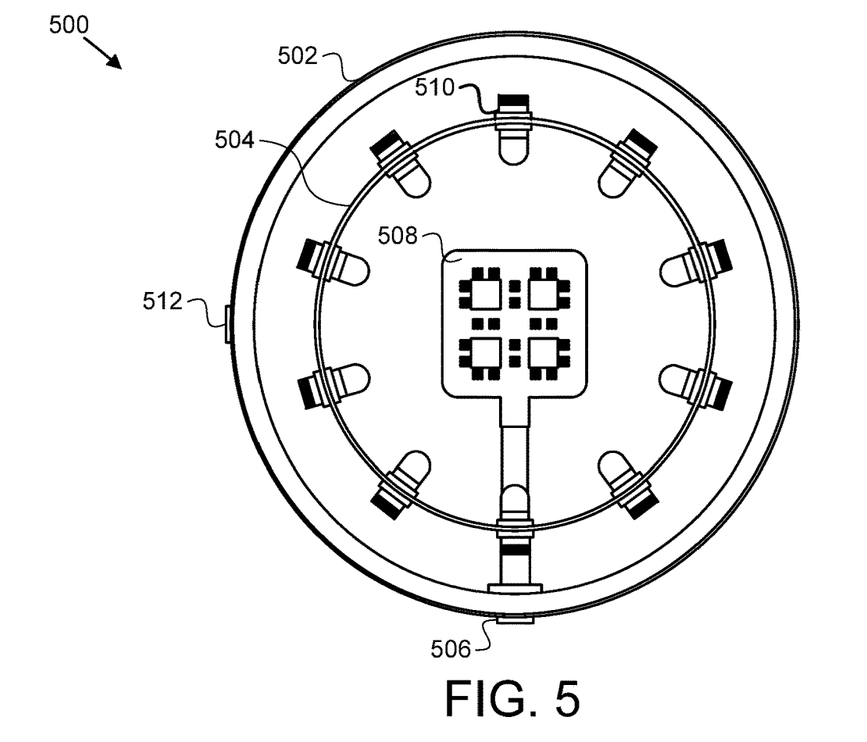
FIG. 5 is a schematic block diagram illustrating one embodiment of a cutaway top view of a reaction reservoir for a high volume low pressure feeder system.
Figure 6:
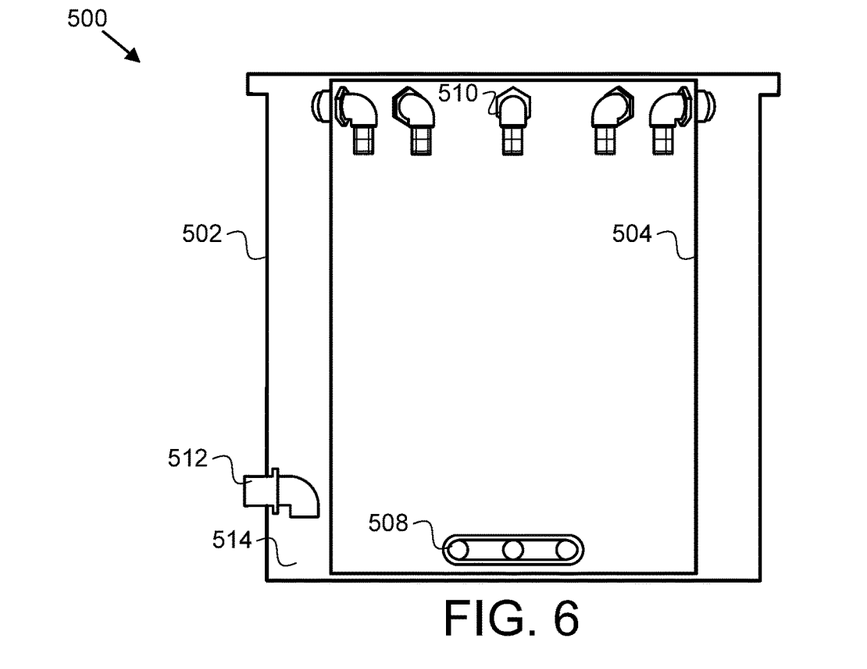
FIG. 6 is a schematic block diagram illustrating one embodiment of a cutaway side view of a reaction reservoir for a high volume low pressure feeder system.

FIG. 5 and FIG. 6 depict embodiments of a reaction reservoir 500 for a high volume low pressure feeder system. The reaction reservoir 500, in the depicted embodiment, comprises an outer wall 502 defining a secondary reservoir, an inner wall 504 defining a primary reservoir, a liquid reactant inlet 506, a liquid reactant diffuser 508, a plurality of interior product outlets 510, an exterior product outlet 512, and a space 514 for fines. In certain embodiments, the reaction reservoir 500 may be substantially similar to the reaction reservoir 104 of FIG. 1 and/or FIG. 2.

As described above, with regard to the reaction reservoir 104, in certain embodiments, the primary reservoir 504 may receive a solid reactant such as DBDMH (e.g., from a reactant source 102 through a top of the reaction reservoir 500). The primary reservoir 504 may receive a liquid reactant, such as water, from the liquid reactant inlet 506 and may introduce the liquid reactant into the primary reservoir 504 through the liquid reactant diffuser 508. The liquid reactant may travel through the primary reservoir 504 from the liquid reactant diffuser 508 toward the interior product outlets 510, reacting with the solid reactant along the way to produce a chemical product, such as hypobromous acid. In one embodiment, openings in the liquid reactant diffuser 508 through which the liquid reactant passes are on a bottom of the liquid reactant diffuser 508, facing downward toward a bottom of the primary reservoir 504, to further maximize a distance the liquid reactant travels within the primary reservoir 504 from the openings in the liquid reactant diffuser 508 to the interior product outlets 510.

In the depicted embodiment, the liquid reactant diffuser 508 is substantially centered toward a bottom of the primary reservoir 504 and the interior product outlets 510 are along a perimeter at a top of the primary reservoir 504 (e.g., an opposite end of the primary reservoir 504) to maximize a distance the liquid reactant travels (e.g., making the distance longer than a height of the primary reservoir 504, the reaction reservoir 500, or the like), providing a dwell time and/or resonance time of the liquid reactant sufficient to allow the liquid reactant to react with the solid reactant to a degree necessary to produce a target concentration.

In certain embodiments, the primary reservoir 504 includes one or more inner walls or pathways creating a serpentine path or other non-direct path for the liquid reactant to follow and/or for the solid reactant to follow through the primary reservoir 504 between the liquid reactant diffuser 508 and the interior product outlets 510, to lengthen the distance of a pathway, creating a longer dwell time and/or resonance time of the liquid reactant within the primary reservoir 502. For example, the primary reservoir 504 may include one or more walls defining a spiral path from the liquid reactant diffuser 508 to the interior product outlets 510.

The chemical product and excess liquid reactant may exit the primary reservoir 504 through the interior product outlets 510, entering the secondary reservoir 502. Fines and/or other particulates may fall out of the chemical product and liquid, gathering in the lower space 514. The chemical product may exit the secondary reservoir 502 through the exterior product outlet 512, to a concentrate reservoir 106, for use by a user, or the like.

Figure 7:
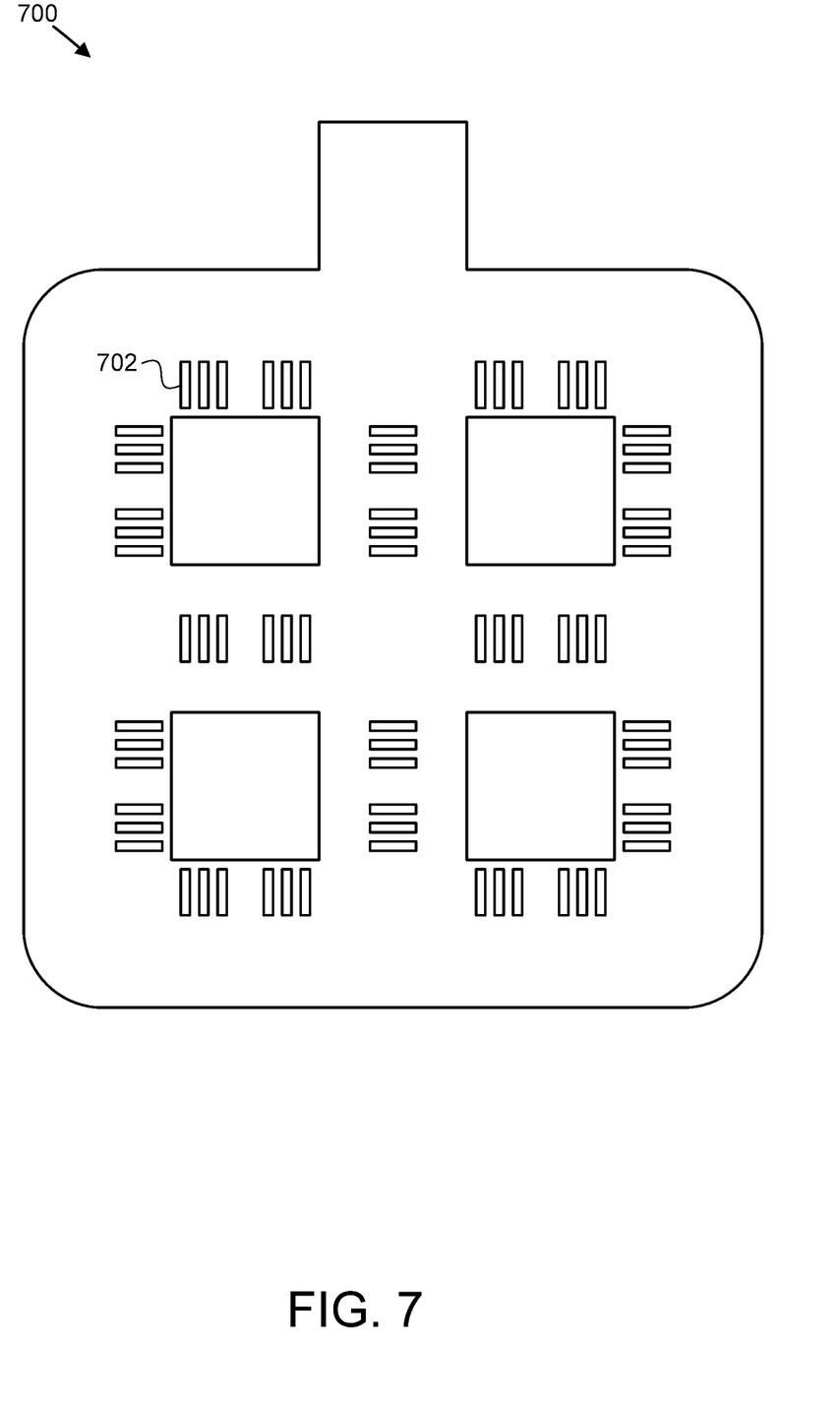
FIG. 7 is a perspective view illustrating one embodiment of a diffuser for a high volume low pressure feeder system.

FIG. 7 depicts one embodiment of a diffuser 700 for a high volume low pressure feeder system. The diffuser 700 includes a plurality of openings 702 through which a liquid reactant such as water passes to enter a reactant reservoir 104, 504. The diffuser 700, in certain embodiments, may be substantially similar to the liquid reactant diffuser 508 described above with regard to FIG. 5.

Figure 8:
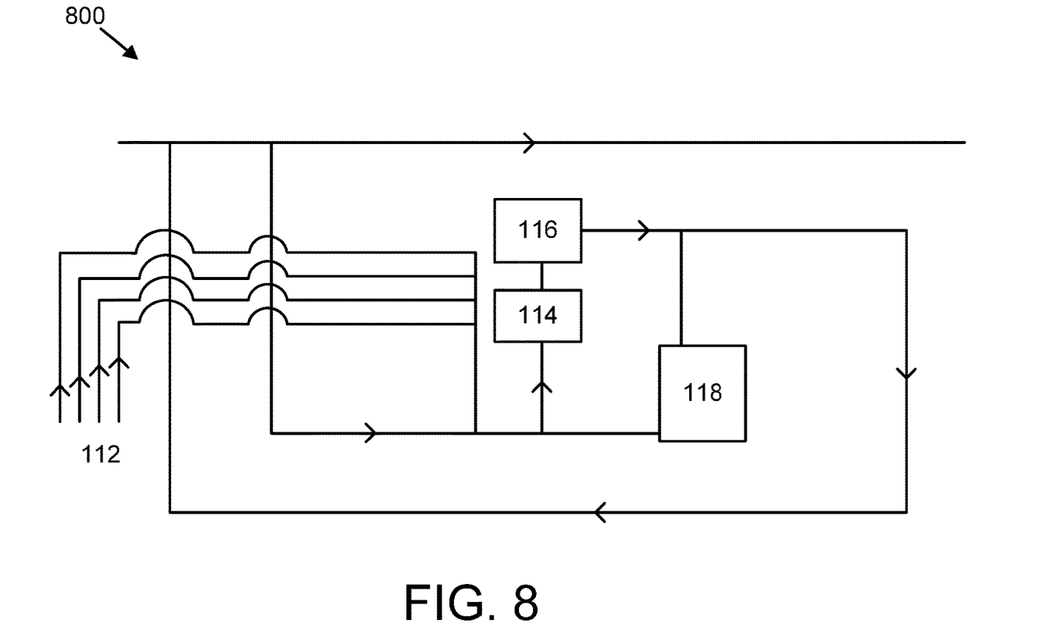
FIG. 8 is a schematic block diagram illustrating one embodiment of a detection system for a high volume low pressure feeder system.

FIG. 8 depicts one embodiment of a detection system 800 for a high volume low pressure feeder system. The detection system 800 may be in communication with the one or more controllers 108 described above, allowing the one or more controllers 108 to determine a concentration of a chemical product (e.g., in a product stream from a reaction reservoir 104, to or from a concentrate reservoir 106, or the like).

The detection system 800 may include a UV spectrometer 116 or other optical sensor that uses light (e.g., UV rays or the like) to determine a concentration of a chemical compound (e.g., a product from the reaction reservoir 104) in a solution, based on the Beer-Lambert law or the like, which states that the absorbance of a solution is directly proportional to the concentration of the absorbing species in the solution and the path length. However, in order to determine an accurate concentration in different conditions, the detection system 800 may include a pH probe 114, one or more pH buffers 112 for reference and/or calibration (e.g., a pH level of about 4, of about 7, of about 10, or the like to form a calibration curve to train and/or calibrate the pH probe) and the one or more controllers 108 may adjust a concentration measurement, base a concentration measurement at least partially on, or the like a pH level of a solution, in addition to a reading from the UV spectrometer 116.

In a further embodiment, the one or more controllers 108 may adjust a concentration measurement, base a concentration measurement at least partially on, or the like a temperature of a liquid reactant, a temperature of a solution stream, or the like. The one or more controllers 108, in another embodiment, may adjust a concentration measurement, base a concentration measurement at least partially on, or the like one or more other components of a liquid reactant, of a solution, or the like, such as an amount of calcium, phosphorous, and/or other chemicals.

In one embodiment, the detection system 800 includes one or more lens cleaning components 118 and the one or more controllers 108 may periodically clean a lens of the UV spectrometer, rinsing the lens with acetic acid or the like. During a lens cleaning cycle, in one embodiment, the one or more controllers manage flow rates, introduction of reactants, or the like based on a last measured concentration level, since the UV spectrometer 116 cannot measure a concentration of the solution during a lens cleaning cycle. In a further embodiment, a last measured concentration level prior to a lens cleaning cycle may be inaccurate, due to the dirty lens, and the one or more controllers 108 may manage flow rates, introduction of reactants, or the like based on a temperature, such as a temperature of the liquid reactant (e.g., a water temperature). For example, the one or more controllers 108 may select a multiplier based on the temperature, and may estimate a concentration using the multiplier, may run in manual mode, or the like. Once the cleaning cycle is complete, the one or more controllers 108 may return to a real-time concentration calculation.

During and/or after a cleaning cycle, or in response to another trigger, the one or more controllers 108 may calibrate the detection system 800 (e.g., the UV spectrometer 116, the pH probe 114, and/or calculations based upon readings therefrom). In one embodiment, the one or more controllers 108 may calibrate the pH probe based on a calibration curve comprising known pH levels stored in one or more pH buffers 112. The one or more controllers 108, in certain embodiments, may calibrate the UV spectrometer 116 for one or more different wavelengths using a calibration filter, to test photometric accuracy and/or linearity for absorption sensors of the UV spectrometer, or the like.

In one embodiment, a calibration filter may be installed as part of the detection system 800, and the one or more controllers 108 may mechanically actuate the UV spectrometer to redirect a lens of the UV spectrometer from the product stream to the calibration filter for calibrating. In a further embodiment, while the one or more controllers 108 may perform the calibration in an automated or substantially automated manner, the one or more controllers 108 may prompt a user to install a temporary removable calibration filter over a lens of the UV spectrometer, in response to which the one or more controllers may perform the calibration. The one or more controllers 108, in certain embodiments, may store results of the calibration process, providing a traceable calibration tool, so that the results may be audited, reviewed, or the like. Once calibration is complete, the one or more controllers 108 may redirect a lens of the UV spectrometer back to the product stream, may prompt a user to remove the calibration filter, or the like.

Figure 9:
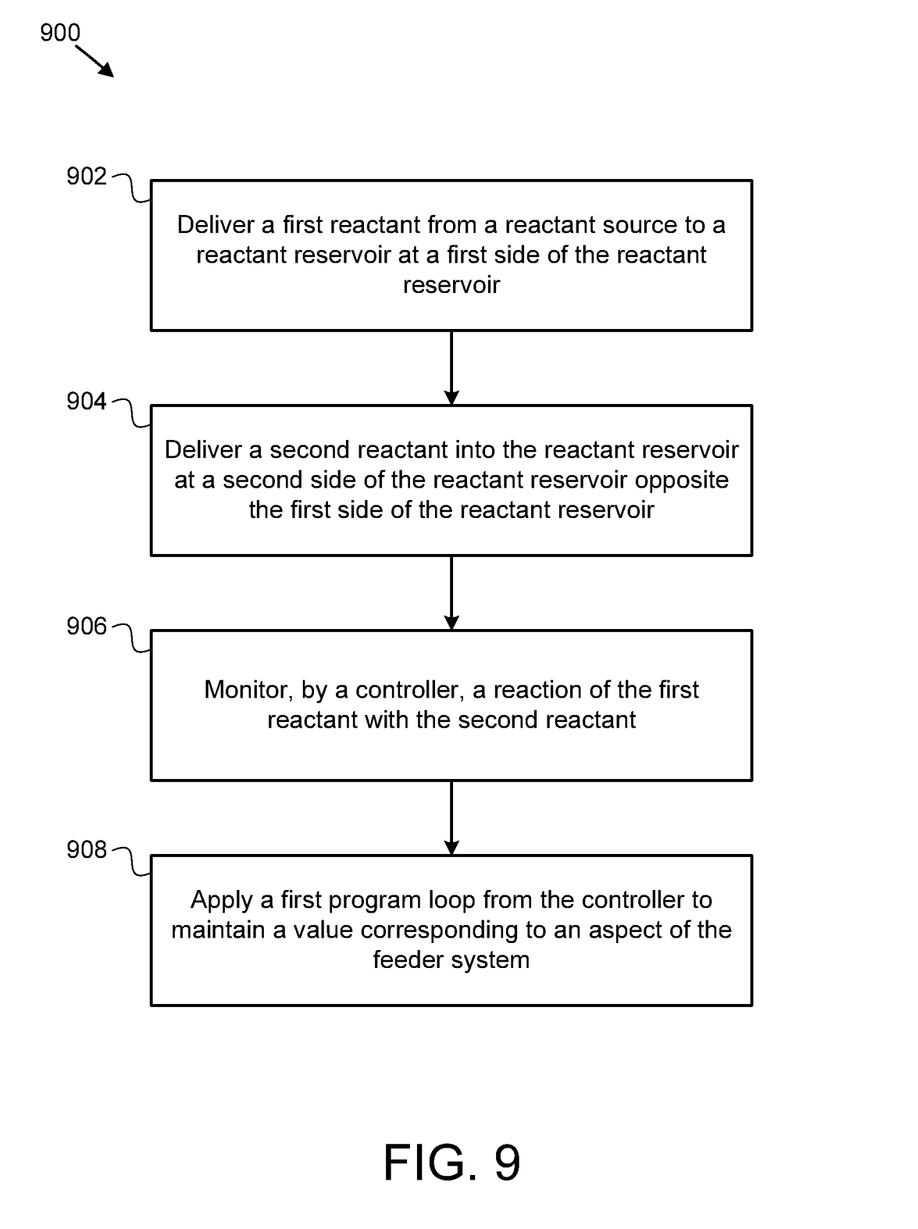
FIG. 9 is a flow diagram illustrating one embodiment of a method for operating a feeder system.

FIG. 9 is a flow diagram illustrating one embodiment of a method 900 for operating a feeder system. In the illustrated embodiment, the method 900 includes, at block 902, delivering a first reactant from a reactant source to a reactant reservoir at a first side of the reactant reservoir. In some embodiments, the first reactant is delivered to the reactant reservoir via a valve. In some embodiments, the valve is an iris valve. In other embodiments, the valve is a dosage valve delivering a predetermined quantity of the first reactant with each cycle of the dosage valve. Other valve types are also contemplated. In some embodiments, an agitator is included to move the first reactant from the reactant source to the reactant reservoir.

At block 904, the method 900 includes delivering a second reactant into the reactant reservoir at a second side of the reactant reservoir opposite the first side of the reactant reservoir. In some embodiments, the second reactant is pumped into the reactant reservoir. In some embodiments, the rate at which the second reactant is pumped into the reactant reservoir is monitored and driven by a controller.

At block 906, the method 900 includes monitoring, by the controller, a reaction of the first reactant with the second reactant. In some embodiments, the reaction is monitored via one or more sensors. In some embodiments, the sensor includes one or more of a UV spectrometer, a temperature sensor, a flow sensor, or the like. In some embodiments, the controller is local to the reaction. In other embodiments, the controller is remote to the reaction.

At block 908, the method 900 includes applying a first program loop from the controller to maintain a value corresponding to an aspect of the feeder system. In some embodiments, the loop is one of a manual, calculated, or auto loop as described above. In some embodiments, the loop is suspended in response to detection of an error threshold being reached. In some embodiments, the first program loop may be modified by a second program loop to adjust the value corresponding to the aspect of the feeder system.

Figure 10:
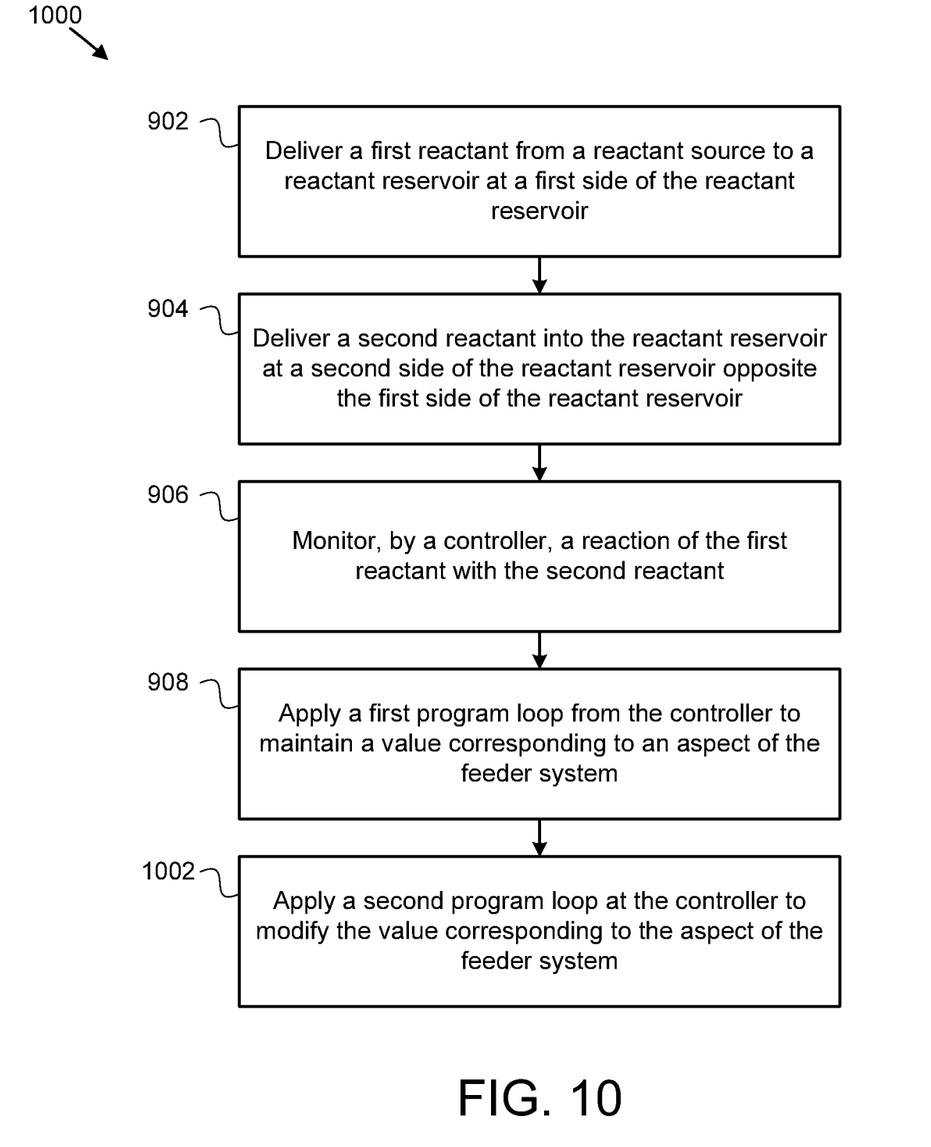
FIG. 10 is a flow diagram illustrating another embodiment of a method for operating a feeder system.

FIG. 10 is a flow diagram illustrating another embodiment of a method 1000 for operating a feeder system. In the illustrated embodiment, the method 1000 is similar to the method 900 described above with reference to FIG. 9. The illustrated embodiment further includes, at block 1002, applying a second program loop at the controller to modify the value corresponding to the aspect of the feeder system. In some embodiments, the second program loop has one of a plurality of tuning states. In some embodiments, the plurality of tuning states includes a low, medium, a high tuning state. In some embodiments, the low tuning state provides for a lower reactant flow rate while a medium and high tuning state accommodates other flow rates. In other embodiments, the low tuning rate provides a small modification to the value corresponding to the aspect of the feeder system while a medium and high tuning rate provide relatively greater rates of modification of the value.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for a feeder system, the apparatus comprising:
 a reactant source to contain a first reactant;
 a reactant reservoir below the reactant source to receive the first reactant from the reactant source and apply a second reactant to the first reactant to facilitate a chemical reaction, the reactant reservoir comprising a primary reservoir and a secondary reservoir with the primary reservoir disposed entirely internal to and within the secondary reservoir, the second reactant applied from a diffuser disposed centrally within the primary reservoir, a plurality of tubular interior product outlets disposed around a perimeter of the primary reservoir to move a product of the chemical reaction from the primary reservoir to the secondary reservoir, the plurality of tubular interior product outlets curved downward away from the reactant source, and an outlet of the secondary reservoir offset above a bottom of the secondary reservoir providing an area for material to settle within the secondary reservoir;
 a frame coupled to the reactant source to maintain the reactant source gravitationally directly above the reactant reservoir; and
 a valve disposed between the reactant source and the reactant reservoir to control flow of the first reactant into the reactant reservoir.

2. The apparatus of claim 1, wherein the frame comprises a first portion associated with the reactant source and a second portion associated with the reactant reservoir, the first portion and the second portion separated by one or more load cells.

3. The apparatus of claim 2, wherein the first portion of the frame is sized to accept a 2200 lb. container of the first reactant.

4. The apparatus of claim 1, further comprising a controller to receive information from one or more sensors and adjust an operating parameter of the apparatus.

5. The apparatus of claim 4, wherein the operating parameter comprises a flow rate of one or more of the first reactant and the second reactant.

6. The apparatus of claim 4, wherein the one or more sensors comprise an ultraviolet spectrometer positioned to monitor contents of the reactant reservoir.

7. The apparatus of claim 4, wherein the one or more sensors comprise a fill level monitor, a concentration sensor, a thermal sensor, a flow rate sensor, a pump operation sensor, and a pH sensor.

8. The apparatus of claim 1, further comprising an agitator positioned within one or more of the reactant source and the reactant reservoir.

9. A feeder system comprising:
 a reactant source to contain a first reactant;
 a reactant reservoir below the reactant source to receive the first reactant from the reactant source and apply a second reactant to the first reactant to facilitate a chemical reaction at atmospheric pressure, the reactant reservoir comprising a primary reservoir and a secondary reservoir with the primary reservoir disposed entirely internal to and within the secondary reservoir, the second reactant applied from a diffuser disposed centrally within the primary reservoir, the primary reservoir comprising a plurality of tubular interior product outlets disposed around a perimeter of the primary reservoir to move a product of the chemical reaction from the primary reservoir to a reservoir outlet of the secondary reservoir, the plurality of tubular interior product outlets curved downward away from the reactant source, and the reservoir outlet of the secondary reservoir offset above a bottom of the secondary reservoir providing an area for material to settle within the secondary reservoir;

a frame coupled to the reactant source to maintain the reactant source gravitationally directly above the reactant reservoir; and a concentrate reservoir to receive the product from the reservoir outlet of the reactant reservoir.

10. The feeder system of claim 9, wherein the first reactant source is oriented to deliver the first reactant to a first side of the reactant reservoir opposite a second side on which the second reactant is received at the reactant reservoir.

11. A method for operating a feeder system, the method comprising:

delivering a first reactant from a reactant source to a reactant reservoir at a first side of the reactant reservoir;

delivering a second reactant into the reactant reservoir at a second side of the reactant reservoir opposite the first side of the reactant reservoir from a diffuser disposed centrally within a primary reservoir of the reactant reservoir;

moving a product of the first reactant with the second reactant from the primary reservoir to a secondary reservoir through a plurality of tubular interior product outlets disposed around a perimeter of the primary reservoir, the primary reservoir disposed entirely internal to and within the secondary reservoir, the plurality of tubular interior product outlets curved downward away from the reactant source, and an outlet of the secondary reservoir offset above a bottom of the secondary reservoir providing an area for material to settle within the secondary reservoir;

monitoring, by a controller, a reaction of the first reactant with the second reactant; and applying a first program loop from the controller to maintain a value corresponding to an aspect of the feeder system.

12. The method of claim 11, wherein applying the first program loop comprises operating in one of a manual mode, a calculated mode, or an auto mode.

13. The method of claim 12, further comprising applying a second program loop at the controller to modify the value corresponding to the aspect of the feeder system.

14. The method of claim 13, wherein the second program loop operates in one of a plurality of tuning states, the plurality of tuning states comprising a low, medium, and high tuning state.

* * * * *